(12) United States Patent
Wen

(10) Patent No.: US 8,360,979 B2
(45) Date of Patent: Jan. 29, 2013

(54) APPARATUS AND METHOD FOR ULTRASONIC COLOR IMAGING

(76) Inventor: Jing Jiang Wen, Sudbury, MA (US)

( * ) Notice: Subject to any disclaimer, the term of this patent is extended or adjusted under 35 U.S.C. 154(b) by 1339 days.

(21) Appl. No.: 11/369,603

(22) Filed: Mar. 7, 2006

(65) Prior Publication Data

US 2006/0184028 A1   Aug. 17, 2006

(30) Foreign Application Priority Data

Sep. 8, 2004  (CN) .................... 2004 1 0074561
Sep. 8, 2004  (WO) ............... PCT/CN2004/001030

(51) Int. Cl.
*A61B 8/00* (2006.01)
*G06K 9/00* (2006.01)

(52) U.S. Cl. ......... 600/443; 600/438; 600/447; 382/162

(58) Field of Classification Search .................. 600/437, 600/443, 438, 447; 382/162, 167, 164
See application file for complete search history.

(56) References Cited

U.S. PATENT DOCUMENTS

| | | | |
|---|---|---|---|
| 5,361,767 A * | 11/1994 | Yukov | 600/442 |
| 5,860,928 A | 1/1999 | Wong et al. | |
| 6,571,018 B1 | 5/2003 | Kim | |
| 6,579,240 B2 * | 6/2003 | Bjaerum et al. | 600/447 |
| 6,868,171 B2 * | 3/2005 | Souluer | 382/128 |

* cited by examiner

*Primary Examiner* — Long V. Le
*Assistant Examiner* — Katherine Fernandez

(57) ABSTRACT

This invention discloses a method and apparatus for ultrasonic color imaging applicable in medical diagnoses and industrial inspections. Multiple color parameters calculated via evaluating a plurality of characterizing properties of the ultrasonic signal attributable to an image point are employed to specify the color of the image point. The produced color image simultaneously exhibits the interior distributions of multiple physical properties of the target under ultrasound inspection, provides much richer interior information of the target than what traditional, single imaging parameter based ultrasonic imaging can provide. The invention enables far more and easier-to-perceive information to be communicated to image viewer's brain, significantly improves the efficiency of image reading, the capability of abnormality discrimination, and the accuracy and reliability of ultrasound inspection. While retaining the traditional capability of locating acoustic interfaces, the disclosed ultrasonic color imaging also provides an effective approach of expressing continuous acoustic medium bodies that prior arts were incapable of delivering.

10 Claims, 1 Drawing Sheet

APPARATUS AND METHOD FOR ULTRASONIC COLOR IMAGING

FOREIGN FILING PRIORITY

PCT/CN2004/001030, Sep. 8, 2004
CN 2004100745612, Sep. 8, 2004

FIELD OF THE INVENTION

This invention relates to ultrasonic imaging, specifically to ultrasonic color imaging employed primarily in industrial non-destructive inspections and medical diagnoses.

BACKGROUND OF THE INVENTION

Prior art ultrasound imaging is essentially black-and-white: The ultrasonic medical color imaging currently available on market is actually the combination of a black-and-white ultrasound reflection image and a Doppler blood flow image using red and blue color to indicate blood flows moving in the opposite directions within blood vessels. U.S. Pat. No. 6,579,240 further expanded color-coded moving objects to solid structures such as pumping cardiac walls. Technically, with the exceptions of cardiac moving structures and blood flow, medical ultrasonic imaging is still in the age of black-and-white, or the age of B-mode (Brightness-mode). Industrial ultrasonic inspection is far more behind in terms of utilizing images.

Pseudo-color image: There is another type of commercially available medical ultrasonic imaging with color display—medical images are expressed in brightness of a soft color such as orange-gray, green-gray, instead of black-and-white. These color images carry no more information than their black-and-white counterpart, are no comparison with color photos or color TV pictures in terms of information richness associated with color. Moreover, color ultrasound imaging has been widely used to refer to ultrasonic imaging device with Doppler blood flow functionality, leaving a not-so-desirable name—"pseudo-color" for brightness color imaging.

Topographic color image: There is yet another type of ultrasonic color image with a coloring method borrowed from topography. Topographic maps published all over the world use colors to express different altitudes: dark blue for deep oceans of lowest altitude, light blue for shallow oceans, green for plains, dark brown for plateaus with highest altitudes, etc. Using brightness in the place of altitude in topographic, a black-and-white ultrasound image becomes a color image. However, topographic color images are never popular, because it provides no more information and no improvements in image reading and abnormality discrimination. It is fair to say that ultrasonic image with topographic coloring is even more pseudo.

The role of color in ultrasound imaging: The ultrasound signals retrieved by an ultrasonic probe do carry information about the interior distributions of acoustic properties of the target, but carry essentially nothing about visual properties such as color. The coloring of prior art ultrasonic imaging, may it be the brightness of grey or other soft colors, topographic coloring, or red-and-blue of Doppler blood flows, is unrelated to the actual color of human organ or tissues. Any color similarities are either accidental or artificial assignment, have nothing to do with the sciences and technologies behind ultrasonic imaging. Both the medical professionals who perform and the patients who receive ultrasound imaging are aware of that the coloring of the images is not real. In facts, not relating to the actual color of target is an advantage rather than a weakness. When something abnormal has happened to a human organ, the color deviations may not be noticeable, but changes in tissue density and elasticity can affect the local acoustic characteristics. The capability of detecting and showing such acoustic deviations is an invaluable advantage of ultrasonic imaging over visual and optical examinations (such as endoscope). Clearly, showing the true color of target should not be a goal pursued by ultrasonic imaging.

Two reasons of using image: There are two primary reasons why ultrasonic medical diagnoses convert non-visual information into visible images. The first reason is space perceiving capability of human visual sense. Human's space perception is a natural instinct requiring no training. An image may not tells desired physical properties of the target, but it always shows the spatial properties such as the locations, shapes, sizes, relative positioning with surrounding objects, etc. The second and more important reason is the extraordinary efficiency that human visual sense possesses when picking up external information. The amount of information that a human brain gets via a glimpse, takes years of listening if converted into audio information to play out without interruption. In technology language, visual sense has a bandwidth substantially greater than that of hearing sense or any other human senses. Because of the excellent spatial perception and tremendous bandwidth of human vision, modern medical diagnosis technologies, such as ultrasound, magnetic resonance, X-ray, CT, all choose image as the primary way for presenting information obtained via all kinds of physical means.

Color means bandwidth: Color has very little to do with spatial perception, but fundamentally impacts the bandwidth For a commonly seen 7 bit brightness image, each image point can be expressed in one of 128 possible brightness levels. In comparison, in a common 7 bit color image, each image point is expressed by three 7 bit color parameters, each can independently take one of 128 possible values, providing 2,097,152 (the cube of 128) possible color alternatives for each image point. In general, the information carried by a color image is the cube of information carried by a brightness image. Because of human vision's born capability of perceiving color, the bandwidth of human vision reading a color image is the cube of the bandwidth of reading a brightness image. It is a pity that existing medical imaging methods, including ultrasound, only utilize a tiny fraction of the bandwidth of human vision. This is exactly what present invention aimed to change.

Another limitation of prior art: Ultrasound can penetrate into non-transparent objects, generating sectional profiles of target without actually cutting through the target. Traditional ultrasonic imaging uses only a single parameter, most often the reflection coefficient of ultrasound signal at image point, to produce an image. Since sound reflection only takes place on an interface between two different materials, such as the contour surface separating a human organ from surrounding tissues, the boundaries of cracks, bubbles or impurities in a machine part, typical ultrasound profile image, such as B-mode ultrasound medical image, is composed of contour lines of different brightness representing exterior and interior interfaces of the target. In order to show interfaces within the target, the sole imaging parameter is reserved to quantify reflection characteristics, leaving single parameter based prior art imaging no effective way of expressing continuous acoustic medium bodies enclosed within the structure boundaries.

DEFINITIONS

The discussion of present invention involves several different types of parameter defined as follows:

Physics parameters: parameters that have apparent physics meanings, such as acoustic impedance, elasticity module, acoustic reflection coefficient, etc.

Signal parameters: parameters that describe or characterize the waveform of a signal, in particular a digitized ultrasound signal. Examples are amplitude peaks, zero crossing locations, etc.

Mathematics parameters: coefficients or coefficient sets obtained via taking mathematic operations on digital signal waveforms.

Other parameters: parameters of no obvious categories, such as filter coefficients, modeling coefficients;

Imaging parameters: an equivalence of "procedure parameter", "intermediate parameter", or "operation parameter" widely found in literatures on hardware and software of digital equipments. Since the "procedure" and "operation" in this document focus on image or imaging, "imaging parameter" is used wherever "procedure parameter", "intermediate parameter", or "operation parameter" can be used. An imaging parameter can be a physics parameter, a mathematics parameter, a signal parameter and other parameter.

Color parameters: typical color images use three quantities to uniquely specify the display color of each and every image point. For example, in most widely used RGB (Red-Green-Blue) color scheme, three dimensionless numerical values are used to specify the amount of Red, Green and Blue respectively. These dimensionless numerical values are referred to as color parameters. Besides RGB and RYB (Red, Yellow, Blue), RYGB (Red, Yellow, Green, Blue) and some six-base-color color schemes also have been reported and actually employed in color imaging equipments or medium platforms.

OBJECTIVES OF THE INVENTION

An objective of present invention is to provide an ultrasonic color imaging apparatus that simultaneously presents the interior spatial distributions of a plurality of physical properties of the target structures, provides much richer information about the target interior than single imaging parameter based prior art, and significantly improving the efficiency of image reading, the capability of abnormality discrimination, and the accuracy and reliability of inspections.

It is another objective of this invention to provide an ultrasonic color imaging method substantially different from the prior art ultrasound color or pseudo-color imaging. The method makes use of the richness of color to represent the richness of the interior acoustic characteristics of a live body or a machine part, and significantly improves the efficiency of image reading, the capability of abnormality discrimination, and the accuracy and reliability of inspections.

DESCRIPTION OF THE INVENTION

The ultrasonic color imaging apparatus comprises following functions: launching an ultrasound signal into the target under inspection; receiving the ultrasound signal that has been acted upon by the exterior and interior structures of the target; converting the received ultrasonic signals into digital signals; processing digital signals; relating selected parts of digital signals to specific image points representing the target under the ultrasound inspection; evaluating a plurality of characterizing properties of the digital signals and storing the results as separate imaging parameters; calculating at least two color parameters from imaging parameters for corresponding image point; using the collection of color parameters of individual image points to display a color image or to form a color image file to be displayed separately from imaging process.

The ultrasonic color imaging method comprises: obtaining the digital signal attributable to a given image point of the target; calculating at least two color parameters via evaluating multiple characterizing properties of the digital signal; assigning the color parameters to the related image point; using the collection of color parameters for separate image points to form a color image showing the combined spatial distributions of multiple physical properties of the target.

For convenience, we use term "imaging parameter" to refer to a characterizing property of a digital signal in discussion and to hold the numerical value of a characterizing property of a digital signal in implementation.

Typically, ultrasonic color imaging of present invention can be realized in following steps:

a) For each frame of ultrasonic color image, pre-select a number of imaging parameters to store a number of characterizing properties that can be evaluated from the digital signal with or without other knowledge regarding the target; pre-determine the number of color parameters to be used for a complete image; pre-define how each color parameter is related to imaging parameters.

b) for every image point representing the target, identify the digital signal attributable to this image point.

c) evaluate all pre-selected characterizing property from the appropriate portion of digital signal to update all corresponding imaging parameters, d) using updated imaging parameters and pre-defined relations to calculate all color parameters, assign color parameters to the image point.

e) collect color parameters of separate image points representing the different portions of target to form an ultrasonic color image.

In a most common application, the received ultrasonic signal, which has traveled a given sound path within the target, provides the information source of all image points on the sound path; The scan of the ultrasound beam along a surface of target, either through electronic beam scan or mechanical probe scan, produces a sectional profile that perpendicularly cut into the target from the scan route of the probe.

The following example illustrates how present invention generates a color image with the information resource of a traditional black-and-white imaging device.

Consider the process that a traditional imaging device generates a sectional profile of 100 pixel (image point) high and 100 pixel wide. Suppose the left vertical bound of image represents the target surface. At a vertical position along the left bound, the ultrasound probe launches an ultrasound signal into the target, receives echoes reflected back by all interfaces on the sound path. The received signal is processed, digitized into 100 digits. The software uses the 100 digits to fill all pixels on the horizontal image line representing object points on the sound path which the received signal has traveled. Running similar operations at 100 vertical positions along left bound produces a 100 horizontal image lines therefore the entire 100×100 image.

Suppose a) the launched ultrasound signal spans a time period corresponding to a spacing of 20 pixels; b) there is a crack 70 pixels underneath the target surface. The digital signal of 100 digits then contains two echoes: the $1^{st}$ through $21^{st}$ digits represent the echo reflected by target surface, the $71^{st}$ through $91^{st}$ digits represent the echo reflected by the crack. All other digits are zero or near-zero. Of 100 pixels on the sound path, only the $1^{st}$ pixel and the $71^{st}$ pixel, representing target surface and the crack respectively, have contributed to the received digital signal. All other 98 pixels did not respond to the sound signal therefore are not represented in the information collected. As a result, in a typical brightness image, the $1^{st}$ and $71^{st}$ pixels are the only two bright spots on the horizontal image line, all others are dark (zero brightness). The brightness of $1^{st}$ pixel is determined by the maximal value selected from $1^{st}$ through $21^{st}$ digits. The brightness of $71^{st}$ pixel is determined by the maximal value selected from $71^{st}$ through $91^{st}$ digits.

Present invention uses the exact same 100 digits to cover the same 100 pixels. In an embodiment, the three imaging parameters are chosen as the peak amplitudes of three largest lobes in the echo. Assume the $1^{st}$ through $21^{st}$ digits describe an echo of five oscillation lobes, the peaks of three largest lobes are 120, −96, 43; and the $71^{st}$ through $91^{st}$ digits describe an echo of four oscillation lobes, the peaks of three largest lobes are 67, −35, and 12. Traditional imaging displays the $1^{st}$ pixel with brightness 120, the $71^{st}$ pixel with brightness 67, all other pixels with brightness 0. In contrast, present invention displays the $1^{st}$ pixel with a color specified by RGB(120, 96, 43), and the $71^{st}$ pixel in a color specified by RGB(67, 35, 12), and all other pixels in RGB(0,0,0). Here RGB(r, g, b) is a Microsoft C++ function that specifies a color by three variables r, g, b representing red, green and blue composition respectively.

The color parameters of an image point can be derived from the same signal attributable to this image point, or from multiple signals attributable to the same image point but are obtained at different times or under different conditions.

It is preferred to use three color parameters so that the obtained color image can be directly saved in a standard digital color image file that most third party image-related devices can share. An easy and effective implementation of three color parameters is directly linking them to three pre-selected imaging parameters. Appropriate normalization may be needed.

Any plural number of color parameters can be used to achieve color imaging. Color devices based on four base-colors and six base-colors have been reported and can be readily supported by present invention. The number of imaging parameters needs not to equal the number of color parameters. In such cases, each color parameter is pre-defined as a different linear or non-linear combination of available imaging parameters.

The imaging parameters can be chosen from but not limited to quantities commonly found in theoretical and practical ultrasonic applications: waveform parameters such as amplitude peaks, zero-crossing points, statistical quantities, various mathematic modeling parameters; parameters of spectrum analysis of signal waveforms; transfer functions; transfer function with compensations to unwanted external interferences; total energy loss along the sound path; reflection coefficients with or without attenuation compensation; reflection coefficients of harmonics of different orders; local distribution functions and their parameters; curvature, normal, and components of normal of an interface; density, elasticity parameter, acoustic impedance, geometric parameters of layered structure, and other physical quantities determined with the help of other means; filter coefficients; various analytical or numerical distribution functions employed for emphasizing or de-emphasizing certain physical effects.

A flow chart is given in FIG. 1 to outline typical procedures to achieve the ultrasonic color imaging of present invention.

Image points of a continuous acoustic medium body between two acoustic interfaces can be expressed by color parameters based two sets of the imaging parameters obtained on the two interfaces respectively.

Multiple frames of color image can be produced from the same collection of ultrasound signals through changing the selections, weights or digital processing methods of imaging parameters, to emphasize different application purposes or physical significances.

SUMMARY

Compared with prior art technologies, the ultrasonic color imaging of present invention has following obvious merits: it simultaneously presents the interior spatial distributions of multiple physical properties of the target under inspection, therefore provides much richer information about the target interiors than traditional, single imaging parameter based ultrasound images. The disclosed imaging method fully utilizes the bandwidth of human vision to color to significantly improve the efficiency of image reading, the capability of abnormality discrimination, and the accuracy and reliability of the inspection. The use of multiple imaging parameters for single image point not only improves the expression of the field points ON acoustic interfaces (where discontinuity exists), but also provides an effective way of expressing field points OFF interfaces (where no discontinuity exists).

EXAMPLE EMBODIMENTS

Figure 1:
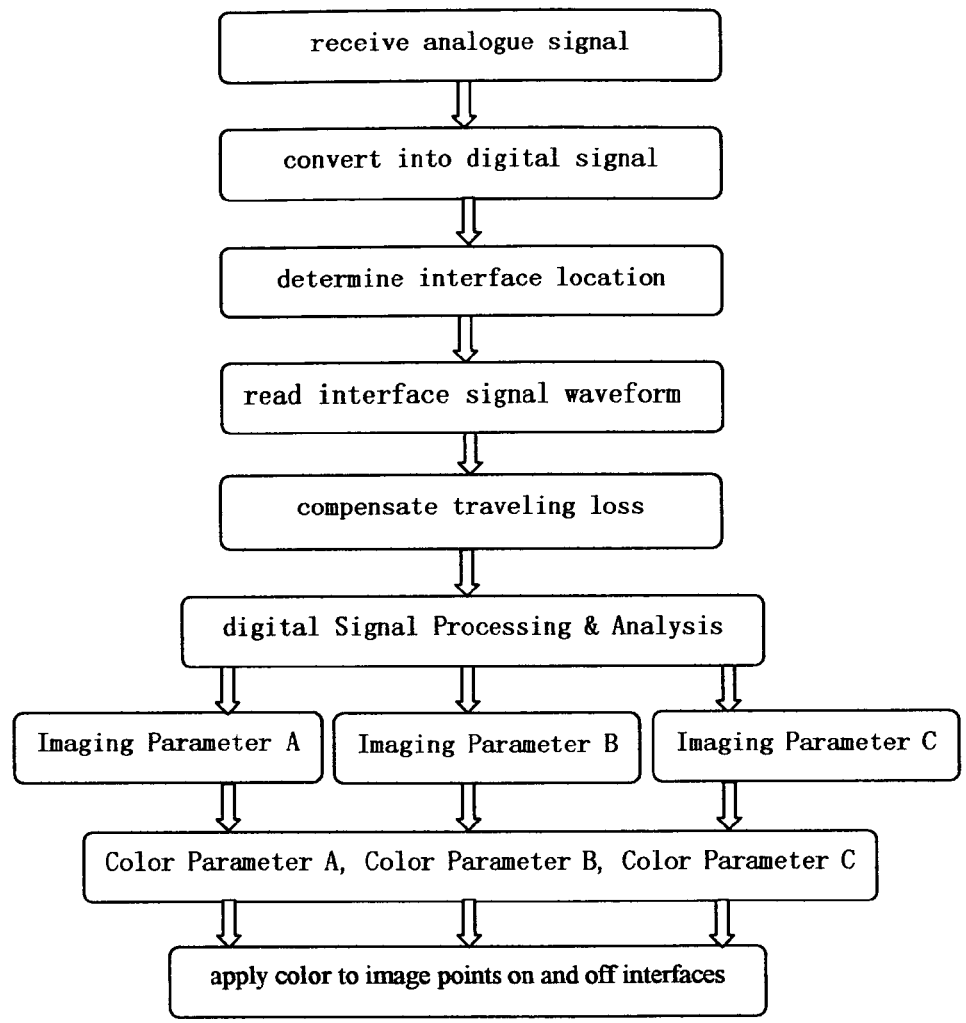
FIG. 1 is a flow chart for obtaining color parameters for each image point.

Of all the colors we have ever seen in the colorful nature, every color can be reproduced on a palette by mixing red, yellow and blue these three base colors. In today's digital world, every image point in color television, color camera and color monitor of a computer can be displayed with endless color alternatives by adjusting several color parameters. Most modern digital color images use red, green and blue as base colors. As an handy example, Microsoft C++ programming provides functions that set a pen with three color parameters, as well as functions that paint any image point with selected pen. In three-parameter color systems, the total number of color alternatives available for each image point equals the cube of the number of possible values that each color parameter may take. The number of possible values is determined by the bits assigned to hold each color parameter. For example, a 7 bits color parameter can take 128 possible values, while an 8 bits parameter can take 256 possible values. A color system using three 7 bits color parameters can provide over two millions of different color alternatives.

With the exception of Doppler blood flow images, nearly all ultrasonic images are reflection images. That is, the image is determined by the reflection characteristics as a function of location within the target being inspected. This type of image represents the spatial distribution of a single imaging parameter. From the perspective of coloring, these images use a single color parameter. The brightness of a mono color is determined by the value of a single imaging parameter—the reflection coefficient to ultrasound at the image point.

The ultrasound color imaging of present invention is substantially different in this regard. The preferred embodiment evaluates three imaging parameters from the ultrasound signal attributable to an image point, then calculates three color parameters to uniquely specify the color of that image point. The color images produced not only exhibits the reflection characteristics of the target interior, but also the distributions of many other physical properties. Compared with non-ultrasound digital color images (such as color television and color photo) of same word length(bits), the ultrasound color image of present invention supports same number of color variations, same discriminating capability, same communication bandwidth via human vision, significantly improves the efficiency of image reading, the capability and accuracy for locating abnormalities.

FIG. 1 is a flow chart outlining the color determination procedure for ultrasound color imaging of present invention According to the theory of sound propagation, an ultrasound signal launched by the ultrasound transducer enters the target from the contact spot, undergoes a series of reflections by interfaces on its traveling path. The reflection-generated ultrasound echoes return to the transducer one after another, be transformed into electric oscillations and digitized into a sequence of digits—digital signal. The software analyzes the digital signal, identifies the location of each interface through the timing of corresponding reflection. At that point, traditional ultrasound imaging draws a single imaging parameter from the digital signal, usually the maximal amplitude of oscillation or the peak of a selected oscillation lobe, and sets the brightness of the image point by the value of the sole imaging parameter. Some imaging devices calculate more than one imaging parameter, such as second order harmonic, to generate a harmonic based image in addition to the main image. In these cases, multiple imaging parameters are employed to generate multiple brightness images, not a multiple-parameter-based color image.

As shown in FIG. 1, present invention departs from the traditional method after the getting the digital signal associated with an acoustical interface. Instead of a single imaging parameter, present invention evaluates multiple imaging parameters from the signal waveform attributable to an interface point to fill in Imaging Parameter A, Imaging Parameter B, and Imaging Parameter C. After necessary normalization, Color Parameter A, Color Parameter B and Color Parameter C are reached for specifying the color of this image point. The collection of color parameters for individual image points forms the color image of the target under inspection.

In the following, we use specific embodiments to showcase present invention and its implementation, characteristics and merits. These embodiments are intended to describe but not to restrict present invention. All embodiments use a procedure similar to the one outlined in FIG. 1, with differences only in selections and usages of three imaging parameters. Phrase "main signal" in the text stands for the portion of digital signal most closely related to the image point being processed.

Embodiment 1

Imaging parameters are implemented as follows:
A: coefficient of fundamental harmonic of main signal.
B: coefficient of second harmonic of main signal.
C: the difference between A and B.

Distinctive characteristics: this embodiment presents the effects of both fundamental harmonic and second harmonic of main signal in a single image. Suppose color parameter A, B, and C represent red, green and blue respectively. At an image point where strongest second harmonic are detected, the image color has greatest green composition, relatively small blue composition, and looks more yellowish as compared with other portion of image. Meanwhile, at an image point where least second harmonic is found, the image color has smallest green composition, relatively large blue composition, looks more purplish as compared with other portion of image. In order to emphasize the non-linear properties of target interior, imaging parameter B can be weighted by a common factor, making the physical effects of second harmonic more apparent.

Embodiment 2

Similar to Embodiment 1, except imaging parameters are defined as:
A: maximal positive peak of main signal.
B: maximal negative peak of main signal.
C: unused.

Distinctive characteristics: This is a case of two parameter color image. Compared with the traditional, maximal-amplitude based brightness image or pseudo-color image, this embodiment effectively differentiates image points by their waveform reshaping functionality. When the acoustic properties vary from one point to another point, the maximal amplitudes of the corresponding signals may remain unchanged, but echo waveforms are much likely to differ. An increased positive peak accompanied by reduced negative peak, or an increased negative peak accompanied by reduced positive peak, are common waveform shifting that can be unambiguously revealed by this embodiment. Alternatively, Imaging Parameter C can be re-defined as a combination of Imaging Parameter A and Imaging Parameter B, such as C=0.6A+0.4B, C=|A|−|B|, C=|A/B|, etc., to turn a two-parameter color image into a three-parameter color image.

Embodiment 3

Similar to Embodiment 1, except imaging parameters are defined as:
A: absolute value of the maximal amplitude of main signal.
B: absolute value of the peak of the lobe ahead the lobe containing A.
C: absolute value of the peak of the lobe behind the lobe containing A.

Distinctive characteristics: compared with Embodiment 2, this embodiment reveals amplitude variations of three signal lobes instead of two lobes, is more responsive to physical factors significantly affecting the waveform of main signal. Examples of such physical factors include ultra-thin layered structure near an interface.

Embodiment 4

Similar to Embodiment 1, except that imaging parameters are based on dividing main signal into three slots, and widths and relative positioning of slots remain unchanged for all image points of same image. As an example, suppose the interface is identified at Nth digits of the digital signal, three slots can be specified as: Slot 1: N−5 to N+3, Slot 2: N+8 to N+10, Slot 3: N+11 to N+16. There is no particular rule, just keep the grouping consistent for an entire image.
A: the sum of absolute values of signal amplitudes within first slot.
B: the sum of absolute values of signal amplitudes within second slot.
C: the sum of absolute values of signal amplitudes within third slot.

Distinctive characteristics: This embodiment is more responsive to waveform altering factors such as ultra-thin layered structure around image point, signal elongation caused by unevenness, coarseness, and incident angle of the sound beam with respect to acoustic interface, etc. Compared with Embodiment 3, this embodiment provides the flexibility of image fine-tuning to achieve optimal balance between sensibility and stability.

Embodiment 5

Similar to Embodiment 1, except that imaging parameters are based on a linear filter derived from the waveform of main signal. Filter coefficients are determined such that main signal is best approximated by output signal of the filter when a pre-defined reference signal is applied as input. Filter coefficients are divided into three groups. The grouping shall remain unchanged for all image points of same image. Imaging parameters are defined as:

A: the sum of all filter coefficients in the first group.
B: the sum of all filter coefficients in the second group.
C: the sum of all filter coefficients in the third group.

Distinctive characteristics: the linear filter represents the comprehensive characteristics of the image point in terms of reshaping the reference signal, and is independent of the ultrasonic probe, provided filter coefficients are calculated properly. The waveform of main signal depends not only on the acoustic properties around image point, but also on the signal waveform before the reflection, which may be represented by a reference signal often obtained by applying the ultrasonic probe to a reference media. The purpose of the linear filter is to rule out the physical effects of ultrasonic probe, achieving an image determined only by the acoustic characteristics of the image point. Grouping filter coefficients allows defining three imaging parameters to be most responsive to waveform variation. Other benefits of this embodiment include filtering out background noises, enhancing effects of the curvature and coarseness of reflecting interface, catching nearby ultra-thin layered structure, etc.

Embodiment 6

Similar to Embodiment 1, except imaging parameters are defined as:

A: reflection coefficient based on maximal amplitude of main signal.
B: estimated or theoretical acoustic impedance of Medium 1.
C: acoustic impedance of Medium 2 calculated using A and B.

Here Medium 1 and Medium 2 represent the acoustic media on incident and exiting sides of the reflecting interface. By acoustic theory, given the reflection coefficient and acoustic impedance of one side, the acoustic impedance of the other side can be directly calculated. The calculated result of Imaging Parameter C sensitively varies with the variation of Medium 2 if the value of Imaging Parameter B is chosen properly, that can be approached by experiences, theoretical estimate, measurement, or try-and-error method.

Distinctive characteristics: Traditional black-and-white or pseudo-color ultrasonic images are mostly reflection based. Since reflection only takes place on an interface, a pure reflection image can not effectively express the continuous medium body between interfaces. In this embodiment, in addition to reflection coefficient of the interface, the acoustic impedances of materials on both sides of interface also play a role in interface expression, making interface image more discriminative. Furthermore, a continuous medium body now can be expressed in terms of its own physical property (acoustic impedances) rather than in terms of interface signal. This embodiment showcases an important advantage of multiple-imaging-parameter-based color images over reflection-based prior art image: not only acoustic interfaces, but also continuously distributed medium bodies are more comprehensively represented in color image.

Embodiment 7

Imaging parameters are same as embodiment 5. The major difference is in image processing for continuous medium bodies. Let A1, B1, C1 and A2, B2, C2 be imaging parameters without travel loss compensation obtained respectively on two interfaces consecutively intersecting the current sound path, d be the distance between the two intersections. An image point on the sound path with a distance x from to the first interface and (d-x) from the second interface will take imaging parameters as:

$$A=A1*(d-x)/d+A2*x/d;$$

$$B=B1*(d-x)/d+B2*x/d;$$

$$C=C1*(d-x)/d+C2*x/d;$$

Distinctive characteristics: the color image produced by this embodiment represents how an acoustic medium body alters the waveform of the passing ultrasound signal. The alteration of signal waveform is mathematically characterized by the filter coefficients on two consecutive reflecting interfaces. Filter coefficients contain not only the physical effects of two reflections, but also the effects of sound path sectioned by two interfaces. This embodiment exemplifies how a continuous acoustic medium body can be effectively expressed by multiple parameter color imaging.

The invention claimed is:

1. An ultrasonic color imaging apparatus for forming a color image of a target with given physical properties, wherein said color image comprises of a plurality of image points, said apparatus comprising:
   an ultrasound generating and receiving means for launching an ultrasound signal into said target, and retrieving an outcome ultrasound signal that has traveled within said target; and
   a processing device configured to perform the following steps of:
   converting said retrieved ultrasound signal into a digital signal;
   relating a selected part of said digital signal to an image point representing said target;
   evaluating a plurality of imaging parameters from said selected part of said digital signal for said image point, wherein each imaging parameter characterizes a different one of the physical properties of said target, and at least one of said physical properties is stationary;
   calculating at least two color parameters dependent on said plurality of imaging parameters, wherein each calculated color parameter quantifies a different base color for said image point;
   forming the color image using said image point, wherein a displayed color of said image point is defined by said at least two color parameters, whereby the color image formed characterizes a plurality of physical properties of said target.

2. The ultrasonic apparatus of claim 1, wherein
   said ultrasound ultrasound generating and receiving means scans along a path on a surface of said target, and said formed color image represents a sectional profile perpendicularly cutting into said target from said scan path.

3. An ultrasonic color imaging method to be applied with an ultrasonic imaging apparatus for forming a color image of a target with given physical properties, wherein said color image comprises of a plurality of image points, the method comprising:

obtaining a digital signal rooted from an ultrasound signal that has traveled within said target and is provided by said ultrasonic imaging apparatus, and relating a selected part of said digital signal to an image point representing said target;

evaluating a plurality of imaging parameters from said selected part of said digital signal for said image point, wherein each imaging parameter characterizes a different one of the physical properties of said target, and at least one of said physical properties is stationary;

calculating at least two color parameters dependent on said plurality of imaging parameters, wherein each calculated color parameter quantifies a different base color for said image point;

forming the color image using said image point, wherein a displayed color of said image point is defined by said at least two color parameters, whereby the color image formed characterizes a plurality of physical properties/conditions of said target.

4. The ultrasonic color imaging method of claim 3, wherein forming the color image comprises:

pre-selecting a number of characterizing properties that can be evaluated from said selected part of said digital signal with or without other known knowledge regarding said target, pre-assigning same number of imaging parameters for holding said characterizing properties, and pre-defining a number of formulas for calculating same number of said color parameters in terms of said imaging parameters, and for each image point, evaluating said characterizing properties, to fill in said imaging parameters, and calculating said color parameters by plugging said imaging parameters into respective said pre-defined formulas.

5. The ultrasonic color imaging method of claim 4, wherein multiple sets of said imaging parameters are evaluated on multiple digital signals that are attributable to a same image point but are obtained under different situations, and said formulas for calculating color parameters are defined to involve imaging parameters on said multiple digital signals.

6. The ultrasonic color imaging method of claim 4, wherein the number of said imaging parameters is not three, but three formulas for calculating color parameters are pre-defined and used to produce three color parameters for said image point.

7. The ultrasonic color imaging method of claim 4 wherein a same collection of obtained digital signals is used to generate multiple color images emphasizing different application purposes or physical significances, wherein each color image uses a different set of said formulas for calculating said color parameters.

8. The ultrasonic color imaging method of claim 3, wherein three imaging parameters are evaluated for calculating three color parameters quantifying base colors of red, green and blue of said image point.

9. The ultrasonic color imaging method of claim 3, wherein said plurality of imaging parameters are chosen from quantities commonly found in ultrasonic applications, comprising: waveform parameters such as amplitude peaks, zero-crossing points, statistical quantities, various mathematical modeling parameters; parameters of spectrum analysis on signal waveforms; transfer functions; transfer function with compensations of unwanted external interferences; total energy loss along the sound path; reflection coefficients with or without attenuation compensation; reflection coefficients of harmonics of different orders; coefficients of harmonics generated by image point; local distribution functions and their parameters; curvature, normal, and components of normal of an interface; density, elasticity parameter, acoustic impedance, geometric parameters of layered structure, and other physical quantities determined with the help of other methods; filter coefficients; various analytical or numerical distribution functions employed for emphasizing or de-emphasizing certain physical effects.

10. The ultrasonic color imaging method of claim 3 wherein said color parameters for each image point within a continuous acoustic medium body are determined by two sets of imaging parameters respectively obtained on two interfaces sandwiching said acoustic medium body.

* * * * *